2,753,372

WATER-DISPERSIBLE ALIPHATIC AMINE-EPI-
CHLOROHYDRIN REACTION PRODUCTS

Lennart A. Lundberg, Stamford, Conn., assignor to American Cyanamid Company, New York, N. Y., a corporation of Maine No Drawing. Application November 19, 1953,
Serial No. 393,246

5 Claims. (Cl. 260—501)

The present invention relates to long chain aliphatic amine-epichlorohydrin condensation products. More particularly, the present invention relates to methods for manufacturing initially water-dispersible, long chain aliphatic amine-epichlorohydrin condensation products of improved storage stability.

Water-dispersible, long chain aliphatic amine-epichlorohydrin condensation products have been prepared by reacting an aliphatic amine containing 12–20 carbon atoms with between 1 and 2 mols of epichlorohydrin for about 4 hours at temperatures up to 100° C. The products are complex alkylation and quaternarization derivatives containing ionic chlorine derived from the chlorine of the epichlorohydrin. Such condensation products are solid waxy materials which, when initially formed, readily disperse in water at 90° C. with only simple stirring. Methods for the preparation of such condensation products and their use in the manufacture of paper are disclosed in detail in co-pending U. S. patent application, Serial No. 221,724 filed on April 18, 1951 by W. F. Reynolds, Jr., now U. S. Patent No. 2,694,629. The products are useful as paper sizing agents particularly when the amine contains at least 16 carbon atoms.

It is a disadvantage that these condensation products become indispersible on standing for only a brief period, typically 1 to 8 weeks, at room temperature. After this time they cannot be dispersed even when the temperature of the water is raised to the boil or even when intensive mechanical agitation is used in place of hand stirring. As a result, up to the present, it has been generally believed that long chain amine-epichlorohydrin condensation products must be used promptly or not at all. This has handicapped commercial utilization of these products, since they are most economically shipped and stored in solid form.

The discovery has now been made that the storage stability of the condensation products referred to is associated with the maximum temperature of the condensation reaction, the duration of the reaction, and the presence of free amine groups in the reaction products.

As a result, it has been found that the storage stability of these products can be greatly extended by:

1. Maintaining the temperature of the condensation reaction below about 80° C.;
2. Terminating the condensation reaction when the amount of ionic chlorine formed is between 0.3 and 0.6 atom of chlorine per nitrogen atom present; and
3. Neutralizing the free amino groups in the condensation product with a lower fatty acid.

It has been found that when these steps are performed, the condensation products thereby obtained have a much extended period of water-dispersibility. Typically, they remain water-dispersible for six months, and in a number of instances have remained water-dispersible for more than a year.

By the phrase "water-dispersible" as used herein is meant the ability of 1 g. of the condensation product to disperse in 100 g. of water at 90° C. in a laboratory glass beaker as the result of only manual stirring with a glass rod to form a homogeneous dispersion which does not separate into its constituent phases on standing several hours. When a condensate fails to disperse under these conditions it floats, usually as a layer of oil, on the surface of the water, and even intensive agitation does not yield a stable dispersion, the oil forming a layer when agitation is terminated. Occasionally the condensation product fails to form an oil and remains as a solid which floats on the water.

More in detail, according to the process of the present invention, between 1 and 2, and preferably from 1.2 to 1.8 mols of epichlorohydrin are reacted with a primary aliphatic amine containing 12 to 20 carbon atoms. The reaction is most readily controlled by heating the amine to reaction temperature either alone or in the presence of an inert solvent, and slowly adding the epichlorohydrin thereto.

An exothermic reaction results and should, at the outset, be controlled by cooling as the storage stability of the material is seriously impaired when the reaction temperature is allowed to rise above about 80° C. for any material length of time. After the initial phase of the reaction has passed heat should be supplied to maintain the temperature in the range of rapid reaction of 65°–80° C.

The condensation reaction proceeds in two theoretical stages. In the first stage compounds of the theoretical formula

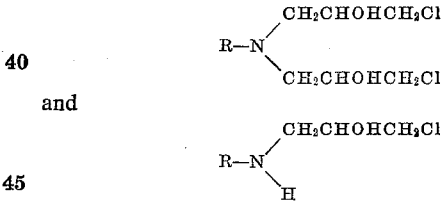

and are formed wherein the R's designate the aliphatic radicals of the amines. Compounds of these formulae contain no ionic chlorine, all of the chlorine being organically bound.

In the second stage, the foregoing compounds react with each other by way of alkylation and quaternarization to form condensation products of varying molecular weights. Each such condensation results in the formation of one atom of ionic chlorine.

Unless the reaction is earlier terminated, substantially all of the organically bound chlorine ultimately passes into ionic form.

The reaction should be terminated when ionic chlorine has formed in amount equal to between 0.3 and 0.6 atom of ionic chlorine per mol of amine taken; that is, per nitrogen atom present, and, typically, this takes place about two hours or less after the exothermic reaction has begun. Analytical determination of this figure from the weight of ionic chlorine in the reaction mixture is facilitated by the use of the following conversion table, which assumes a reaction in the absence of water or other solvent. Should water or a solvent be used, an appropriate correction must be made for its weight.

| Mols Epichlorohydrin [1] | Ionic Chlorine in Reaction Product | |
|---|---|---|
| | Percent By Weight [2] | Atoms [3] |
| 1.4 | 2.52 | 0.3 |
| 1.4 | 3.77 | 0.45 |
| 1.4 | 4.60 | 0.55 |
| 1.4 | 5.0 | 0.6 |
| 1.8 | 2.22 | 0.3 |
| 1.8 | 3.35 | 0.45 |
| 1.8 | 4.07 | 0.55 |
| 1.8 | 4.60 | 0.6 |

[1] Per mol of amine taken.
[2] Of reaction product.
[3] Atoms of ionic chlorine per nitrogen atom present in the reaction product.

When the amount of ionic chlorine in the reaction mixture has increased to fall within the ratio set forth above, the reaction is terminated by neutralizing the residual free amine groups with a lower monocarboxylic acid and cooling the mixture to room temperature. The acid employed should be selected from the group consisting of saturated, monocarboxylic acids of not more than 3 carbon atoms; that is, formic, acetic and propionic acids and the corresponding halogenated fatty acids such as mono, di and tri chloroacetic acid. When longer chain acids are used, a product is obtained which is unduly difficult to disperse even in boiling water, and this is the case also when hydrochloric acid is employed. Acetic acid is preferred because of its volatility, stability, and lack of toxicity while yielding products of excellent water-dispersibility.

The amount of acid added should be at least sufficient to substantially neutralize the reaction product; that is, to neutralize at least ¾ of the free amino groups present. This amount may be calculated from the mols of ionic chlorine formed. In practice I prefer to add sufficient acid to neutralize all the free amino groups present, this amount affording a product of better storage stability while avoiding the danger of adding too little. A 25%–50% excess of acid is tolerated well and does no harm.

The acids are best added in anhydrous or glacial form, no advantage being associated with the presence of water.

The product may be cooled in any convenient manner, but it is preferred to flow it onto a water-cooled rotating drum equipped with a scraping knife.

Preferably, the temperature of the condensation reaction will be maintained as near to 80° C. as possible and a temperature of about 75° C. affords a rapid reaction while avoiding the danger of overheating.

Preferably also, the reaction will be terminated when the amount of ionic chlorine formed is equal to 0.45–0.55 atoms of nitrogen present, compositions in this range having both very satisfactory storage stability while yielding best results as paper sizes, particularly when about 1.5 mols of epichlorohydrin are taken per mol of amine.

The invention will be further described by the examples which follow. It will be understood that these examples are illustrative embodiments of the invention and are not to be construed in limitation thereon. Parts are by weight unless otherwise stated.

*Example 1*

In a reaction vessel fitted with stirrer and thermometer was melted 2176 g. (7.33 mols) of octadecylamine. To this was slowly run in over 1.5 hours 949 g. (10.21 mols) of epichlorohydrin and the temperature maintained at 75°–80° C. for two hours by cooling and heating as necessary. Analysis showed the ionic chlorine content to be 4.43% at the end of this time based on the weight of the reaction mixture. The molten reaction mixture was divided into portions. One portion was retained as control. To the others acid was added as shown in the table below. The products were then bottled and allowed to cool.

When cool, the products were tested for dispersibility by stirring 1 g. of each of the materials in a beaker with 100 cc. of water at 90° C. using a glass stirring rod for the purpose. Satisfactory dispersion took place when a homogeneous dispersion of the reaction product formed within about 1 minute which did not separate into phases in 24 hours. Unsatisfactory dispersion took place when the condensation product, after stirring, rose to the surface of the water.

The test was repeated after the reaction products had been stored at room temperature for 6 months. Results are as follows:

| Sample | Acid Added | | Dispersibility in Hot Water | |
|---|---|---|---|---|
| | Name | Mols | Initial | After 6 Mos. |
| A | None | | Satisfactory | Unsatisfactory. |
| B | HCl | 0.5 | Slow | Slow. |
| C | Acetic | 0.1 | Satisfactory | Unsatisfactory. |
| D | ___do___ | 0.25 | ___do___ | Satisfactory.[1] |
| E | ___do___ | 0.5 | ___do___ | Do.[2] |
| F | Formic | 0.5 | ___do___ | Do. |
| G | Monochloroacetic | 0.5 | ___do___ | Do. |

[1] This material was found to be indispersible when tested 6 months later.
[2] This material remained dispersible when retested 6 months later.

The foregoing procedure was repeated except that the temperature of the condensation reaction was maintained throughout at 85°–90° C. Although the product contained 3.96% by weight of ionic chloride, it was indispersible when combined with 0.5 mol of acetic acid and tested at once by the above described procedure, demonstrating the importance of careful temperature control.

*Example 2*

The reaction of epichlorohydrin with octadecylamine was repeated according to Example 1. After 2 hours of reaction the chlorine content of the mixture was 4.72%, based on the weight of the reaction mixture. A part of this material was neutralized with acetic acid and cooled. Another part of this material was further heated at 95° C. until its ionic chlorine content was 5.55% by weight. This sample was also neutralized with acetic acid and cooled. Both samples were tested for their water-dispersibility in the same manner as the samples of Example 1. Results are as follows:

| Sample | Percent Ionic Chlorine | Dispersibility in Hot Water | |
|---|---|---|---|
| | | Initial | After 6 Mos. |
| A | 4.72 | Satisfactory | Satisfactory. |
| B | 5.55 | Unsatisfactory | Unsatisfactory. |

I claim:

1. Process for the preparation of aliphatic amine-epichlorohydrin condensates of improved stability on storage which comprises heating 1 mol of a primary alkyl amine containing between 12 and 20 carbon atoms with from 1 to 2 mols of epichlorohydrin at a temperature between about 65° and 80° C. until a condensation product forms containing between 0.3 and 0.6 atoms of ionic chlorine per nitrogen atom present, and incorporating therein sufficient of a saturated, monocarboxylic acid containing not more than 3 carbon atoms to neutralize at least ¾ of the free amino groups present.

2. Process according to claim 1 wherein the amine and the epichlorohydrin are heated at a temperature of about 75° C.

3. Process according to claim 1 wherein the amine and the epichlorohydrin are reacted until the condensation product contains between 0.45 and 0.55 atoms of ionic chlorine per nitrogen atom present.

4. Process according to claim 1 wherein the amount of fatty acid incorporated is sufficient to neutralize all the free amino groups present.

5. Process according to claim 1 wherein the fatty acid is acetic acid.

References Cited in the file of this patent

UNITED STATES PATENTS

| | | |
|---|---|---|
| 1,977,253 | Stallman | Oct. 16, 1934 |
| 2,143,388 | Schlack | Jan. 10, 1939 |

FOREIGN PATENTS

| | | |
|---|---|---|
| 675,665 | Great Britain | July 16, 1950 |